United States Patent [19]
Ohtomo et al.

[11] Patent Number: 5,774,211
[45] Date of Patent: Jun. 30, 1998

[54] LASER LEVELING SYSTEM FOR SETTING PIPES

[75] Inventors: Fumio Ohtomo; Kunihiro Hayashi; Jun-ichi Kodaira; Hiroyuki Nishizawa; Ken-ichiro Yoshino; Satoshi Hirano; Yohei Ogawa, all of Tokyo-to, Japan

[73] Assignee: Kabushiki Kaisha Topcon, Tokyo-to, Japan

[21] Appl. No.: 627,430

[22] Filed: Apr. 4, 1996

Related U.S. Application Data

[63] Continuation-in-part of Ser. No. 302,051, Sep. 7, 1994, Pat. No. 5,612,781.

[30] Foreign Application Priority Data

| Sep. 9, 1993 | [JP] | Japan | 5-248765 |
| Sep. 17, 1993 | [JP] | Japan | 5-231522 |
| Jun. 24, 1994 | [JP] | Japan | 6-166105 |

[51] Int. Cl.$^6$ ............................................. G01B 11/26
[52] U.S. Cl. ........................... 356/141.2; 356/141.5; 356/152.2
[58] Field of Search .................. 356/141.1, 141.2, 356/141.5, 141.4, 139.03, 152.2

[56] References Cited

U.S. PATENT DOCUMENTS

| 3,612,694 | 10/1971 | Mottier et al. | 356/110 |
| 3,773,421 | 11/1973 | Gievers | 356/152 |
| 3,790,277 | 2/1974 | Hogan | 356/152 |
| 4,053,238 | 10/1977 | George et al. | 356/249 |
| 4,830,489 | 5/1989 | Cain et al. | 356/73 |
| 4,874,238 | 10/1989 | Ochi et al. | 356/1 |
| 5,098,185 | 3/1992 | Watanabe et al. | 356/5 |
| 5,204,731 | 4/1993 | Tanaka et al. | 356/1 |
| 5,267,014 | 11/1993 | Prenninger | 356/152 |
| 5,313,409 | 5/1994 | Wiklund et al. | 364/556 |
| 5,610,711 | 3/1997 | Rando | 356/247 |

FOREIGN PATENT DOCUMENTS 6-137870 of 1994 Japan.

OTHER PUBLICATIONS

U.S. Serial No. 08/141,047 specification and drawings "Laser Rotative Irradiation Apparatus Having Reciprocating Laser Scanning System" corresponds to Japanese Laid--Open Publication No. 6-137870.

*Primary Examiner*—Mark Hellner
*Attorney, Agent, or Firm*—Nields, Lemack & Dingman

[57] ABSTRACT

The present invention provides an object reflector detection system, in which laser beam is emitted toward an object reflector and reflection light beam is received to detect presence or absence and position of the object reflector, whereby there are provided a laser beam emitter and a reflection light beam detector, and further a laser beam emitter for emitting polarized irradiation light beam toward the object reflector, and a reflection light beam detector for detecting polarized reflection light beam from the object reflector, and the reflection light beam detector having a first detection means for detecting polarized reflection light beam from the object reflector, a second detection means for detecting polarized light beam different from the polarized reflection light beam from the object reflector and a reflection light beam detection circuit for identifying the object reflector based on comparison between output of the first detection means and output of the second detection means.

20 Claims, 10 Drawing Sheets

FIG. 5B OUTPUT SIGNAL OF DIFFERENTIAL AMPLIFIER 34

5,774,211

LASER LEVELING SYSTEM FOR SETTING PIPES

This application is a continuation-in-part of U.S. Ser. No. 08/302,051 filed Sep. 7, 1994, now U.S. Pat. No. 5,612,781.

BACKGROUND OF THE INVENTION

The present invention relates to an object reflector detection system for detecting an object reflector in the field of surveying using laser beam, in which polarized irradiation beam is irradiated from a main unit to the object reflector and the polarized reflect ion beam reflected by the object reflector is detected.

In order to determine reference of height in the field of civil engineering and architectural technique, laser rotary irradiation system for rotary scanning of polarized irradiation beam in a horizontal plane is now used.

In recent years, visible semiconductor laser has been developed for practical application, and a laser rotary irradiation system using the visible semiconductor laser has also appeared, and this has made it possible to perform visual surveying. In such a laser rotary irradiation system, laser output is restricted in order to ensure safety for operators. For this reason, working distance has become relatively short in the surveying and measurement requiring visual confirmation of reflection of the polarized irradiation beam.

In this respect, a laser rotary irradiation system is currently used, in which polarized irradiation beam is reciprocally scanned to increase apparent luminance of the polarized reflection light beam and working distance is elongated. In order to achieve reciprocal scanning within adequate range, it is necessary to identify scanning position. For this purpose, an object reflector detection system is used, in which an object reflector is arranged at a working point and polarized reflection light beam from the object reflector is detected, and the position of the object reflector is identified.

In the object reflector detection system as described above, in order to identify the object reflector, outgoing light is polarized in such manner that a direction of polarized reflection light from the object reflector changes in proportion to polarizing direction of the outgoing light. This is to discriminate from unnecessary reflector such as glass surface, which has a property to reflect light by preserving polarizing direction.

In the laser rotary irradiation system as described above, reflection light is detected by detecting means corresponding to polarized light from the object reflector. There are often many unnecessary reflectors at the working site for civil or architectural engineering, and the modes of reflection are not constant, containing various polarizing components.

For this reason, in case strong reflection light enters detector of main unit, e.g. in case laser beam from the laser rotary irradiation system perpendicularly hits unnecessary reflector having lustrous surface, or in case reflection light reflected from reflecting object optically similar to the object reflector enters detector of main unit, it is often erroneously detected as an object reflector, and reciprocal scanning is often performed at erroneous position.

SUMMARY OF THE INVENTION

The object reflector detection system according to the present invention is used for identifying an object reflector, i.e. a target of irradiation of laser beam, without erroneous recognition in case a reference line and a reference plane are formed using laser beam in surveying operation, whereby there are provided a laser emitter for emitting polarized irradiation light beam toward an object reflector, and a reflection light beam detector for detecting polarized reflection light beam from the object reflector, and further, a first detecting means for detecting polarized reflection light beam from the object reflector by the reflection light beam detector, a second detecting means for detecting polarized light beam different from the polarized reflection light beam from the object reflector, and a reflection light detection circuit for identifying the object reflector based on comparison between output of the first detecting means and output of the second detecting means.

DETAILED DESCRIPTION OF THE PREFERRED EMBODIMENTS

Figure 1:
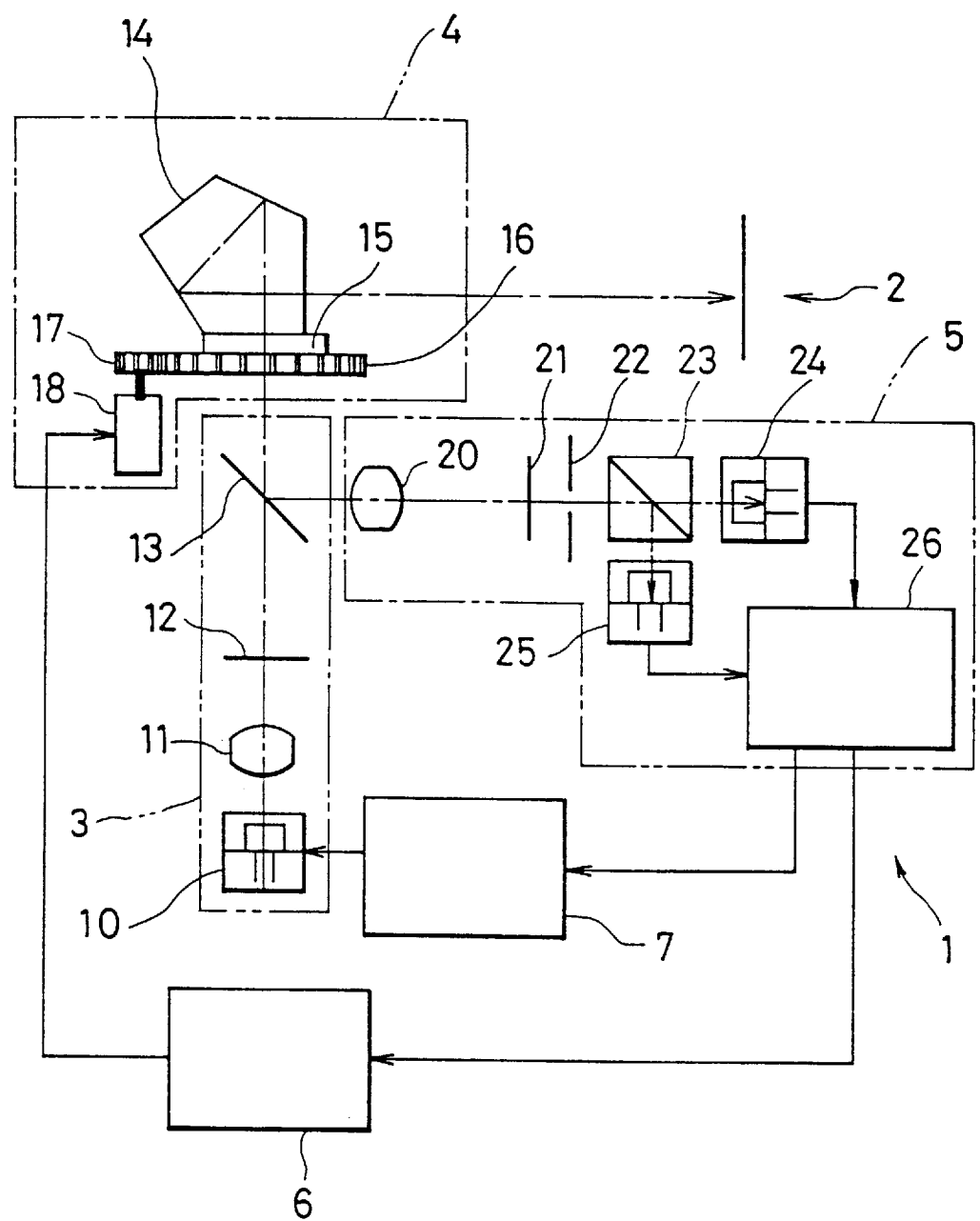
FIG. 1 is a drawing for explaining a first embodiment of the present invention.

FIG. 1 shows a laser rotary irradiation system provided with an object reflector detection system according to the present invention. The laser rotary irradiation system comprises a rotary irradiation system main unit 1 and an object reflector 2, which is arranged with a certain distance from the rotary irradiation system main unit 1.

First, description is given on the rotary irradiation system main unit 1.

The rotary irradiation system main unit 1 comprises a laser light emitter 3, a rotating unit 4, a reflection light detector 5, a rotating controller 6, and a light emission element drive unit 7.

The laser light emitter 3 is first described.

On optical axis of a laser diode 10, which emits polarized irradiation light beam of linearly polarized light, a collimator lens 11, a first λ/4 birefringence member 12 and a perforated mirror 13 are arranged in this order from the direction of the laser diode 10. The polarized irradiation light beam of the linearly polarized light emitted from the laser diode 10 is made to parallel light beam by the collimator lens 11 and is converted to circularly polarized light by the first λ/4 birefringence member 12. The polarized irradiation light beam of circularly polarized light is emitted to the rotating unit 4 through the perforated mirror 13.

The rotating unit 4 is to emit and scan the polarized irradiation light beam coming from the laser beam emitter 3 in horizontal direction. A pentagonal prism 14 for turning optical axis of polarized irradiation light beam from the laser beam emitter 3 by 90° is provided on a rotation support 15, which is rotated around optical axis of the polarized irradiation light beam, and the rotation support 15 is connected to a scanning motor 18 via a driven gear 16 and a driving gear 17.

The polarized reflection light beam from the object reflector 2 enters the rotating unit 4. The polarized reflection light beam entering the pentagonal prism 14 is turned to the perforated mirror 13 and is reflected toward to the reflection light detector 5 by the perforated mirror 13.

Next, description will be given on the reflection light detector 5.

On reflection optical axis of the perforated mirror 13, a condenser lens 20, a second λ/4 birefringence member 21, a pinhole 22, a dichroic mirror or a polarized beam splitter 23, and a first photodetector 24 comprising photodiode and others are arranged in this order from the perforated mirror 13, and a second photodetector 25 comprising photodiode and others is arranged on reflection optical axis of the polarized beam splitter 23. Output from each of the first photodetector 24 and the second photodetector 25 is inputted to a polarizing reflection light beam detector circuit 26.

The polarized light beam splitter 23 splits polarized reflection light beam entering the reflection light detector 5 and guides it to the first photodetector 24 and to the second photodetector 25. The second λ/4 birefringence member 21 and the polarized beam splitter 23 are arranged in such manner that the polarized irradiation light beam emitted from the laser beam emitter 3 passes through the λ/4 birefringence member twice then is converted polarizing reflection light beam returned to the main unit is directed to the first photodetector 24, and the polarizing reflection light beam returned to the main unit in the same polarizing direction as that of the polarized irradiation light beam emitted from the laser beam emitter 3 is directed to the second photodetector 25.

Figure 2:
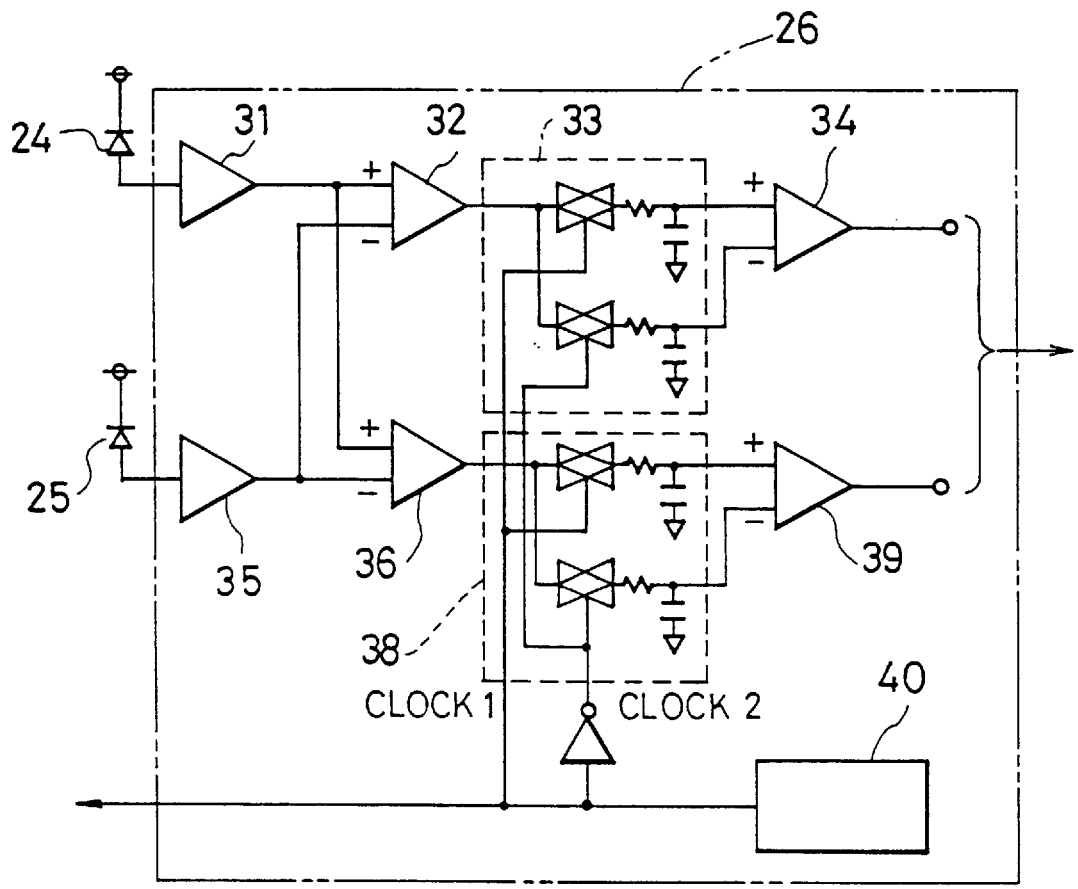
FIG. 2 is a block diagram showing a polarized reflection light beam detection circuit of the above embodiment.

Description is now given on an example of the polarizing reflection light beam detection circuit 26, referring to FIG. 2.

Output of each of the first photodetector 24 and the second photodetector 25 is inputted to a differential amplifier 32 via an amplifier 31 and an amplifier 35, and output of the differential amplifier 32 is inputted to a differential amplifier 34 via a synchronous detector 33. Output from the first photodetector 24 and the second photodetector 25 is inputted to an adding amplifier 36 via the amplifier 31 and the amplifier 35, and output of the adding amplifier 36 is inputted to a differential amplifier 39 via a synchronous detector 38. Output from the differential amplifier 39 and the differential amplifier 34 is inputted to the rotation controller 6.

The polarized reflection light beam detection circuit 26 is provided with an oscillator circuit 40, which outputs clock signals for synchronous detection to the synchronous detector 33 and the synchronous detector 38 and also clock signals necessary for pulse modulation to the light emission element drive unit 7.

The rotation controller 6 controls rotation of the scanning motor 18 based on the signals from the reflection light detector 5, and the polarized irradiation light beam emitted from the laser light beam emitter 3 is reciprocally scanned around the object reflector 2 by the rotation controller 6.

The light emission element drive unit 7 performs pulse modulation to the polarized irradiation light beam emitted from the laser diode 10 based on the clock signals from the polarizing reflection light beam detection circuit 26.

Now, description will be given on the object reflector 2, referring to FIG. 3.

A reflection layer 28 is formed on a substrate 27. On left half (in the figure), a λ/4 birefringence member 29 is put. Exposed portion of the reflection layer 28 is used as a reflection portion for reflecting to preserve polarizing direction of incident light beam, and the portion of the λ/4 birefringence member 29 is used as a polarized light converting reflector for reflecting to convert and reflecting polarizing direction with respect to the incident light beam. The reflection layer 28 comprises a retroreflection material, and a plurality of small corner cubes or spherical reflectors are arranged. The λ/4 birefringence member 29 has such effect that the polarized reflection light beam generates phase difference of λ/4 with respect to the incident light beam.

In the following, description will be given on the operation.

The polarized irradiation light beam emitted from the laser diode 10, which is driven by the light emission element drive unit 7, is modulated based on the clock signals from the oscillator circuit 40. The polarized irradiation light beam of linearly polarized light emitted from the laser diode 10 is turned to parallel beam by the collimator lens 11 and is further turned to polarized irradiation light beam of circularly polarized light after passing through the first λ/4 birefringence member 12. The circularly polarized irradiation light beam passes through the perforated mirror 13 and is turned toward horizontal direction by the pentagonal prism 14 and is emitted.

The pentagonal prism 14 is rotated by the scanning motor 18 via the driving gear 17 and the driven gear 16. Rotating range of the pentagonal prism 14 covers the entire periphery at first, and the polarized irradiation light beam emitted from the pentagonal prism 14 scans over the entire periphery.

By the scanning over the entire periphery, the polarized irradiation light beam passes through the object reflector 2. When passing through it, polarized irradiation light beam is reflected by the object reflector 2, and the polarized reflection light beam enters the pentagonal prism 14.

As already described, one-half of the object reflector 2 is simply the reflection layer 23, and the other half is the λ/4 birefringence member 29 which is put on the reflection layer 28. Therefore, the polarized reflection light beam reflected on the exposed portion of the reflection layer 28 is circularly polarized light preserving polarizing state of the incident polarized irradiation light beam. It passes through the λ/4 birefringence member 29 and is reflected on the reflection layer 28. Further, the polarized reflection light beam passing through the λ/4 birefringence member 29 is circularly polarized light with its phase deviated by λ/2 with respect to the polarizing state of the incident polarized irradiation light beam.

The polarized reflection light beam reflected on the object reflector 2 enters the perforated mirror 13 turned by the pentagonal prism 14 by 90°, and the perforated mirror 13 reflects the reflection light beam toward the condenser lens 20. Through the condenser lens 20, the reflection light beam enters the second λ/4 birefringence member 21 as convergent light. The reflection light beam, returned as circularly polarized light, is converted to linearly polarized light by the second $\lambda/4$ birefringence member 21 and enters a pinhole 22. As described above, phase differs by $\lambda/2$ between the reflection light beam reflected on the exposed portion of the reflection layer 28 and the reflection light beam passing through and reflected on the $\lambda/4$ birefringence member 29, and plane of polarization varies by 90° in the two reflection light beams converted to linearly polarized light by the second $\lambda/4$ birefringence member 21.

The pinhole 22 gives such effect that the reflection light beam having optical axis deviated to, i.e. not perfectly facing the polarized irradiation light beam emitted from the main unit does not enter the photodetectors 24 and 25, and the reflection light beam passing through the pinhole 22 enters the polarized light beam splitter 23.

The polarized light beam splitter 23 gives such effect that the light beam having different polarizing direction by 180° from the polarized irradiation light beam emitted from the laser beam emitter 3 passes through, and the light beam having different polarizing direction by 90° from the polarized irradiation light beam emitted from the laser light beam emitter 3 is reflected. After passing through the polarized light beam splitter 23, the reflect ion light beam is split into polarized components perpendicular to each other, and the photodetectors 24 and 25 receive the split reflection light beams respectively.

In regard to light received by the first photodetector 24 and the second photodetector 25, when the polarized reflection light beam passing through the $\lambda/4$ birefringence member twice outside the main unit, i.e. the polarized reflection light beam reflected on the portion of the $\lambda/4$ birefringence member 29 of the object reflector 2, enters the reflection light detector 5, light quantity entering the first photodetector 24 is increased more than the light quantity entering the second photodetector 25 due to the relationship between the second $\lambda/4$ birefringence member 21 and the polarized light beam splitter 23. When the polarized reflection light beam not passing through the $\lambda/4$ birefringence member, i.e. the polarized reflection light beam reflected on the exposed portion of the reflection layer 28 of the object reflector 2 or on other unnecessary reflector enters, the light quantity entering the second photodetector 25 is increased more than the light quantity entering the first photodetector 24.

By finding out the difference between the incident light quantities of the polarized reflection light beams to the first photodetector 24 and the second photodetector 25, it is possible to identify whether the incident polarized reflection right beam has been reflected on the exposed portion of the reflection layer 28 of the object reflector 2 or it has been reflected on the portion of the $\lambda/4$ birefringence member 29.

More detailed description will be given below.

In case of the reflection light beam, which has passed through the $\lambda/4$ birefringence member 29 twice, the light quantity entering the first photodetector 24 of the reflection light detector 5 is increased more than the light quantity entering the second photodetector 25. The signals are given in FIG. 4 as a and b. The signals from each of the photodetectors 24 and 25 are amplified by the amplifier 31 and the amplifier 35, and the difference is obtained by the differential amplifier 32. The signal is given as c in FIG. 4. When output signal of the differential amplifier 32 is synchronously detected by a No. 1-clock from an oscillator circuit 40, positive voltage (d in FIG. 4) to bias voltage is obtained, and when it is synchronously detected by a No. 2-clock, negative voltage (e in FIG. 4) to bias voltage is obtained.

Taking a difference between the voltages obtained by synchronous detection (d–e), the differential amplifier 34 outputs positive voltage (f in FIG. 4) to bias voltage.

In case of the reflection light beam not passing through the $\lambda/4$ birefringence member 29, light quantity entering the second photodetector 25 of the reflection light detector 5 is increased more than the light quantity entering the first photodetector 24. The signals are given as h and i in FIG. 4. The signals from each of the photodetectors 24 and 25 are amplified by the amplifier 31 and the amplifier 35, and the difference is obtained by the differential amplifier 32. The signal is given as j in FIG. 4. When output signal of the differential amplifier 32 is synchronously detected by the No.1-clock from the oscillator circuit 40, negative voltage (k in FIG. 4) to bias voltage is obtained. When it is synchronously detected by the No. 2-clock, positive voltage (l in FIG. 4) to bias voltage is obtained. Taking a difference between the voltages obtained by synchronous detection (k–l), the differential amplifier 34 outputs negative voltage (m in FIG. 4) to bias voltage.

Figure 3:
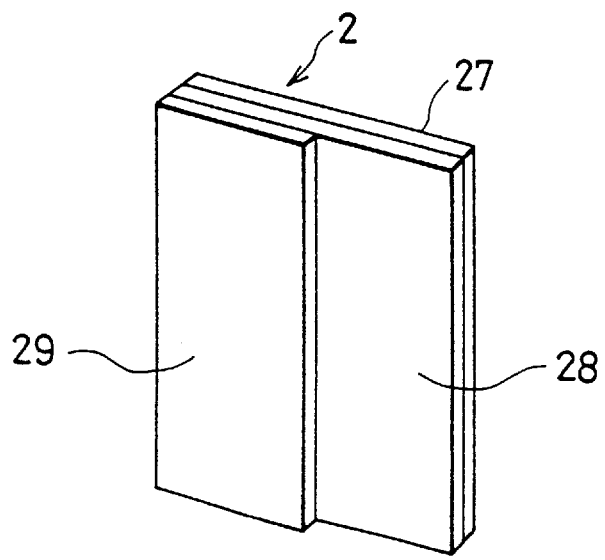
FIG. 3 shows an example of an object reflector in the above embodiment.
Figure 5A:
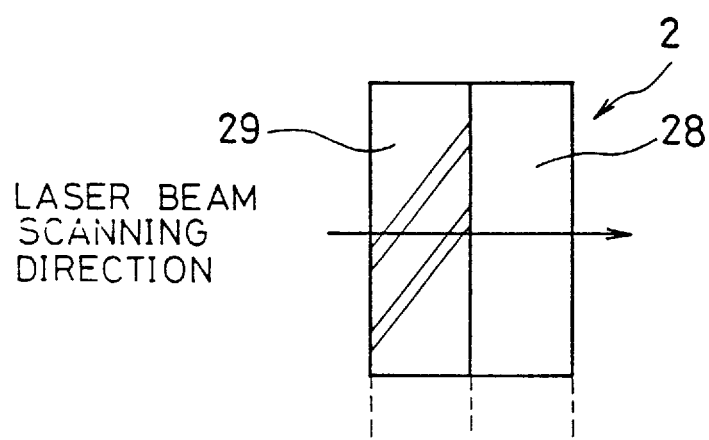
FIGS. 5(A) and (B) are drawings respectively for explaining relationship of the object reflector, polarized irradiation light beam and output signal from the object reflector.

When the object reflector 2 in FIG. 3 is scanned by the polarized irradiation light beam, output of the differential amplifier 34 in the reflection light detection circuit 26 has waveform as shown in FIG. 5(B). In case positive signal appears in output of the differential amplifier 34 and trailing of negative signal occurs within a given time from trailing of positive signal, it is identified as the object reflector 2. The scanning motor 18 is controlled and driven by the rotation controller 6. The pentagonal prism 14 is reciprocally rotated, and the polarized irradiation light beam emitted from the rotary irradiation system main unit 1 is reciprocally scanned around the object reflector 2.

In case the object reflector 2 is used, if rotating direction of the polarized irradiation light beam is reversed, the sign (+ or −) of the output signal of the differential amplifier 34 of the reflection light detection circuit 26 is reversed.

In case the polarized irradiation light beam emitted from the rotary irradiation system main unit 1 is reflected once on mirror etc. and enters and is reflected from the object reflector 2, the sign (+ or −) of output signal of the differential amplifier 34 is reversed to the rotating direction of the polarized irradiation light beam when reflection light beam is received. Thus, it is possible to identify whether it is the reflection light beam returned after reflecting once on an object other than the object reflector 2 or it is the reflection light beam reflected on an object other than the object reflector 2.

Figure 6:
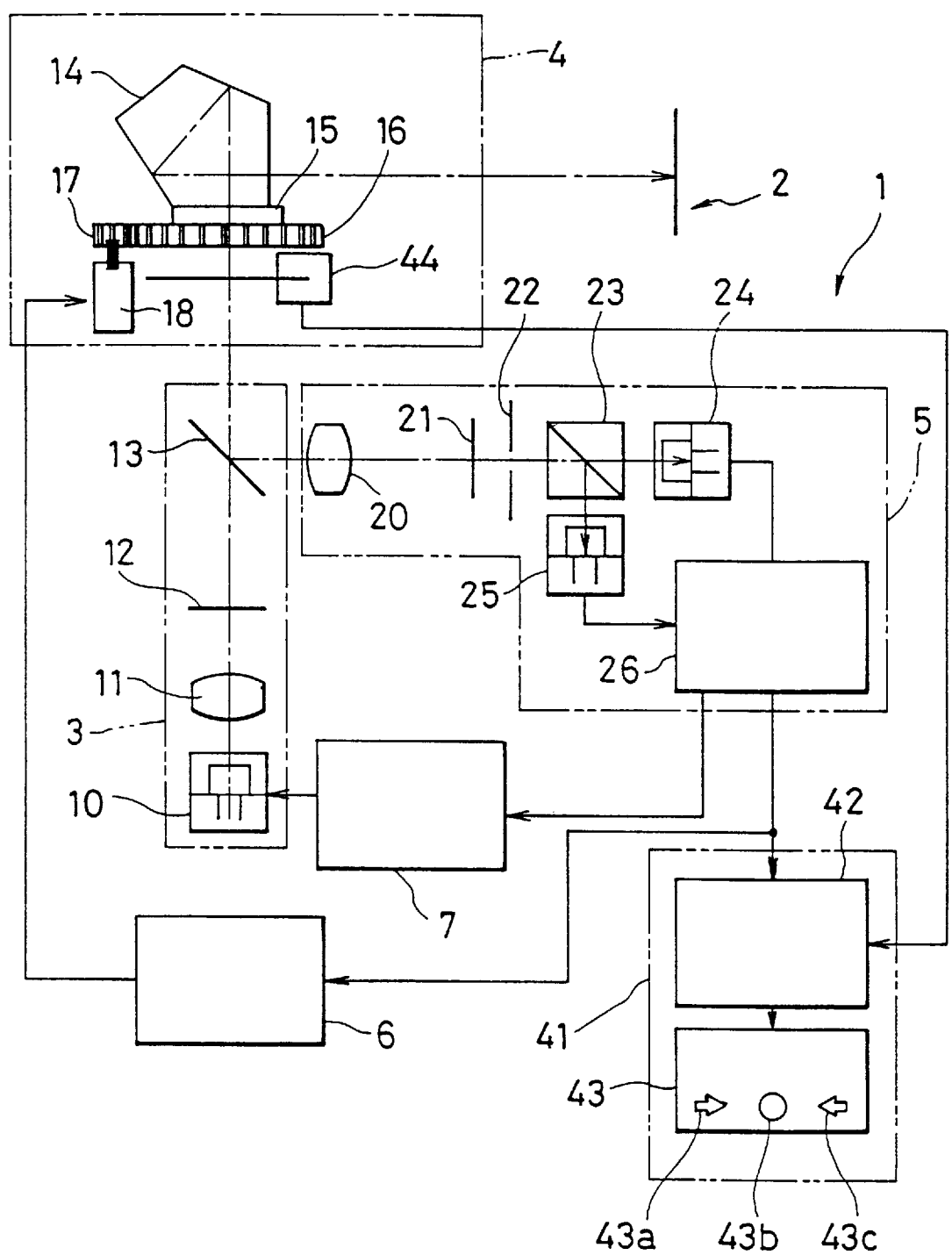
FIG. 6 is a drawing for explaining a second embodiment of the invention.

Description will be given now on a second embodiment, referring to FIG. 6. In FIG. 6, the same component as in FIG. 1 is referred by the same symbol, and detailed description is not given here.

The embodiment given in FIG. 6 is provided with an alignment display unit 41.

The alignment display unit 41 comprises a position identifier 42 and a display 43. To the position identifier 42, signals showing light receiving conditions of the first photodetector 24 and the second photodetector 25 from the reflection light beam detection circuit 26 are inputted, and signals from an encoder 44, which detects rotating position of the pentagonal prism 14 on the rotating unit 4, are also inputted.

By displaying on the alignment display unit 41, the rotating unit 4 is stopped, and the point of irradiation of the polarized irradiation light beam can be correctly and easily aligned with boundary between the exposed portion of the reflector layer 28 of the object reflector 2 and the portion of the $\lambda/4$ birefringence member 29.

Figure 4:
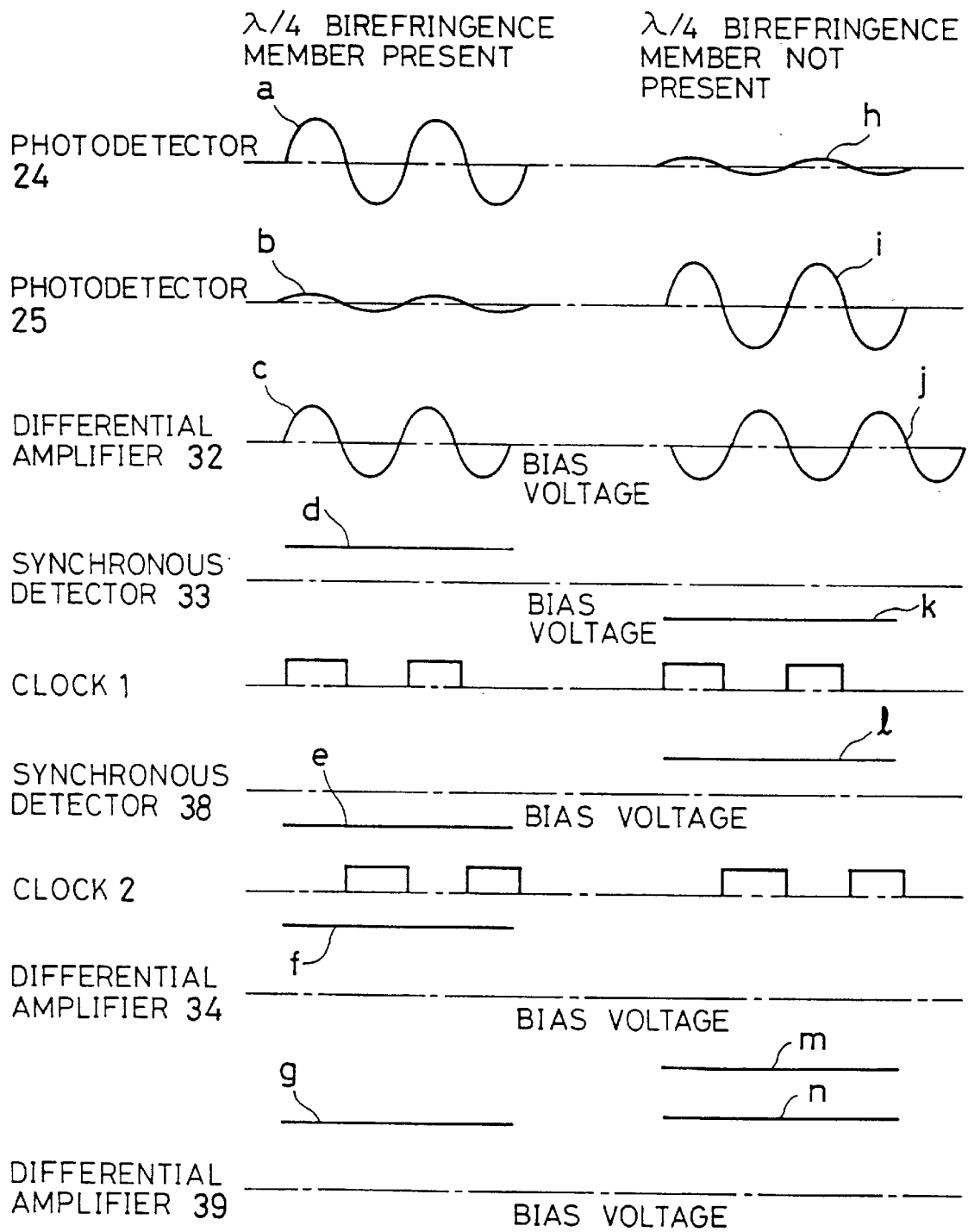
FIG. 4 represents signal waveforms in the above polarized reflection light beam detection circuit.

When the polarized irradiation light beam hits an arbitrary position of the object reflector 2, output signals of the differential amplifier 34 of the reflection light detection circuit 26 are as shown in FIG. 4 and FIG. 5. In case output signal of the differential amplifier 34 has positive voltage to bias voltage, the polarized irradiation light beam is at left portion of the object reflector 2 in FIG. 5. In case output signal of the differential amplifier 34 is in negative voltage to bias voltage, the polarized irradiation light beam is at right portion of the object reflector 2 in FIG. 5. In case output signal of the differential amplifier 34 is in bias voltage, and output signal of the differential amplifier 39 for detecting presence or absence of reflection light is in positive voltage to bias voltage, the polarized irradiation light beam is at the center of the object reflector 2 in FIG. 5. These three different conditions are identified by the position identifier 42, and the results are inputted to the display 43. In case the polarized irradiation light beam is not at the center, it is indicated by an arrow 43a and an arrow 43c, showing moving directions. If it is at the center, it is displayed by the display 43b at the center.

By providing the alignment display unit 41, it is possible to perform aligning adjustment of the polarized irradiation light beam by the display 43 easily and accurately by a single operator.

Figure 7:
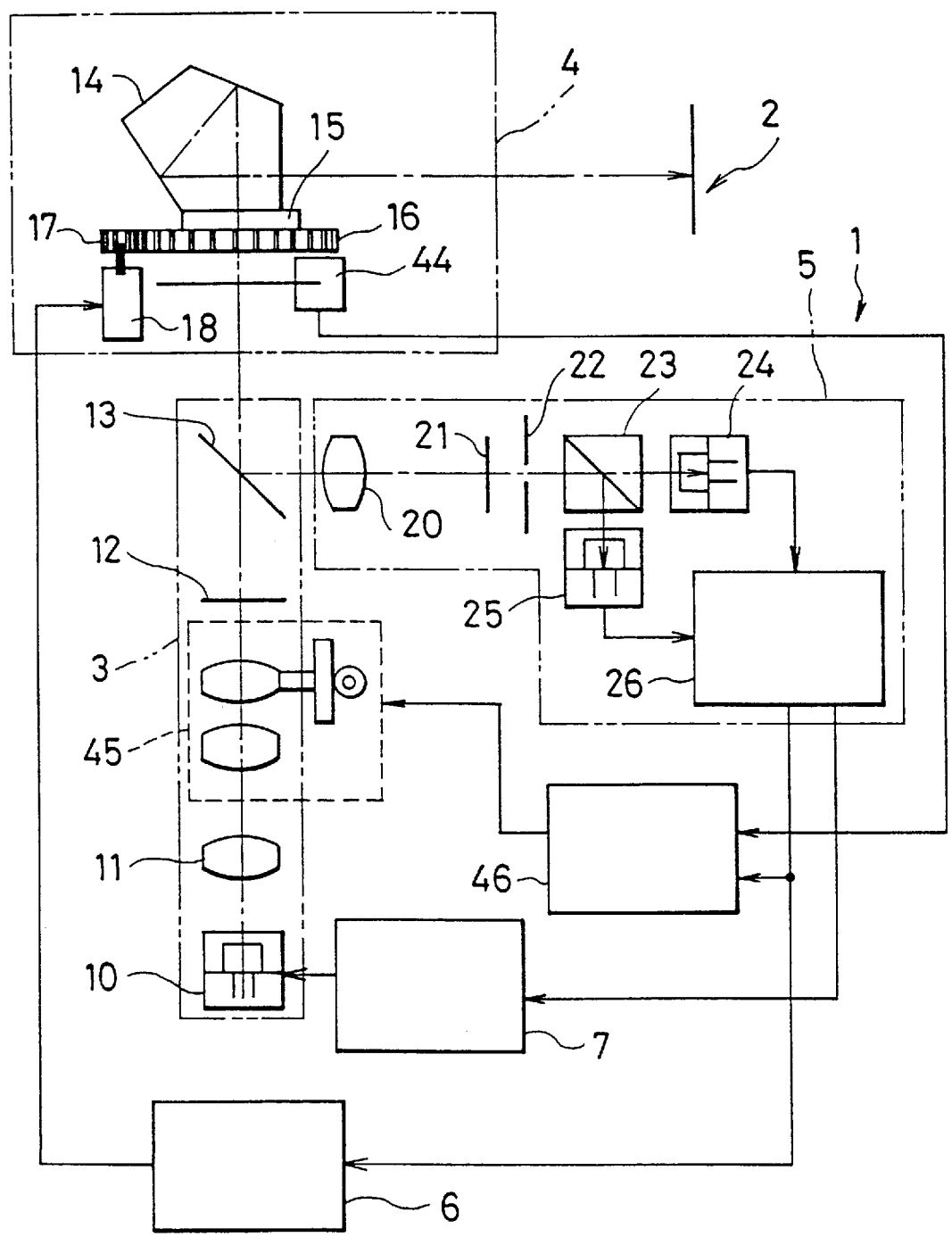
FIG. 7 is a drawing for explaining a third embodiment of the invention.

Description is now given on a third embodiment, referring to FIG. 7.

The embodiment shown in FIG. 7 has auto-focusing function. It determines the distance between the rotary irradiation system main unit 1 and the object reflector 2 and adjusts focusing position of the polarized irradiation light beam emitted by an auto-focusing mechanism based on the results of measurement.

In FIG. 7, the same component as in FIG. 6 is referred by the same symbol.

An auto-focusing mechanism 45 is provided between the collimator lens 11 of the laser light emitter 3 and the first λ/4 birefringence member 12. The auto-focusing mechanism 45 is driven by a focus controller 46. To the focus controller 46, light receiving condition of the first photodetector 24 and the second photodetector 25 from the reflection light beam detection circuit 26 and position signal from the encoder 44 are inputted.

The distance between the rotary irradiation system main unit 1 and the object reflector 2 can be calculated backwards from angle and width of the object reflector 2 by detecting, angle when the polarized irradiation light beam passes through the width of the portion of the λ/4 birefringence member 29 of the object reflector 2, and the width of the exposed portion of the reflection layer 28.

FIG. 5 shows light receiving condition of the first photodetector 24 and the second photodetector 25 of the polarized reflection light beam reflected by the object reflector 2 in case the object reflector 2 is scanned by the polarized irradiation light beam. Central angle to rotating center of the pentagonal prism 14 matching the width of the object reflector 2 can be obtained by counting the number of pulses in the encoder 44 from startup of positive signal of output of the reflection light beam detection circuit 26 to the startup of negative signal. The width of the object reflector 2 is already known, and the distance between the rotary irradiation system main unit 1 and the object reflector 2 can be calculated. The results of the calculation are inputted to the auto-focusing mechanism 45, and the auto-focusing mechanism 45 adequately corresponding to the measured distance is operated.

In the above explanation, scanning angle between startup of positive signal to startup of negative signal is obtained, while it is also possible to measure the time interval from startup of positive signal to startup of negative signal and to obtain distance from the relation with scanning speed. In this case, however, error to the setting value of the scanning speed is turned to an error in distance measurement, and it is more accurate and reliable to measure distance by detecting the angle, which is not influenced by error to the setting value of the scanning speed.

Figure 8:
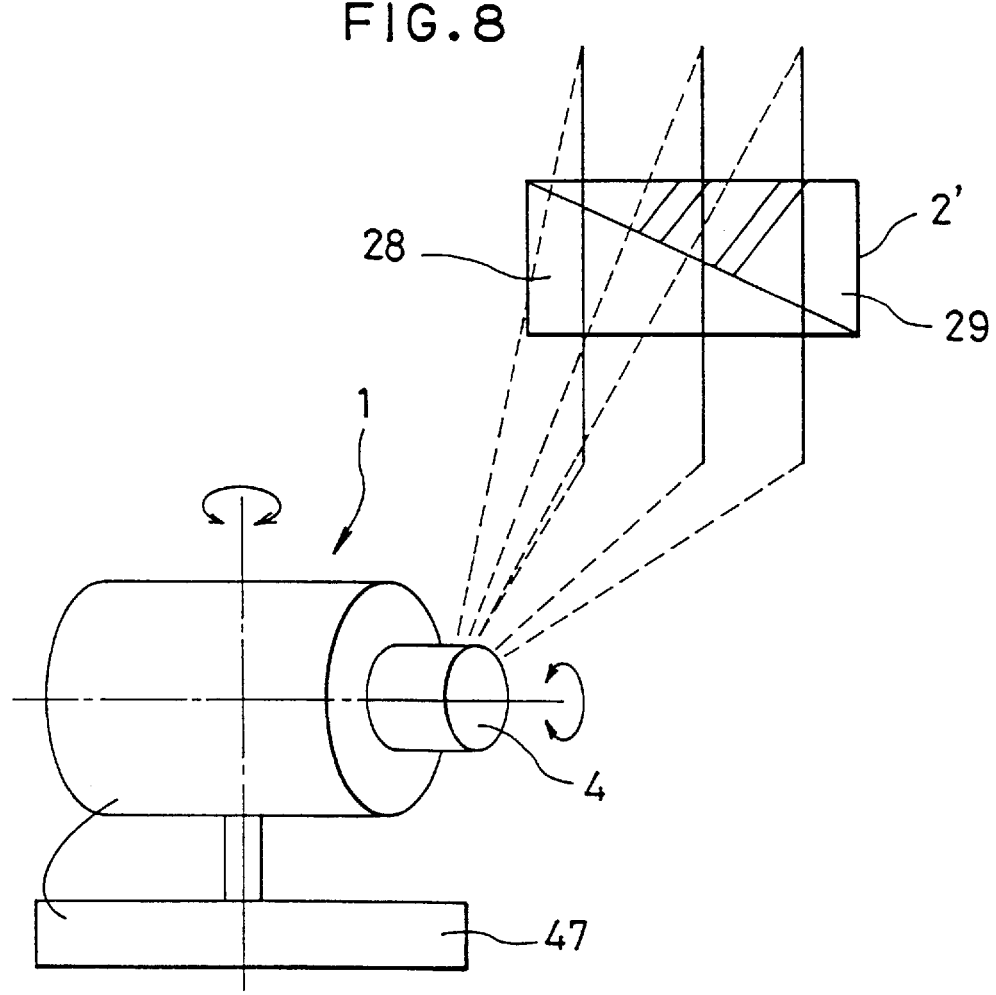
FIG. 8 is a drawing for explaining a fourth embodiment of the invention.
Figure 9:
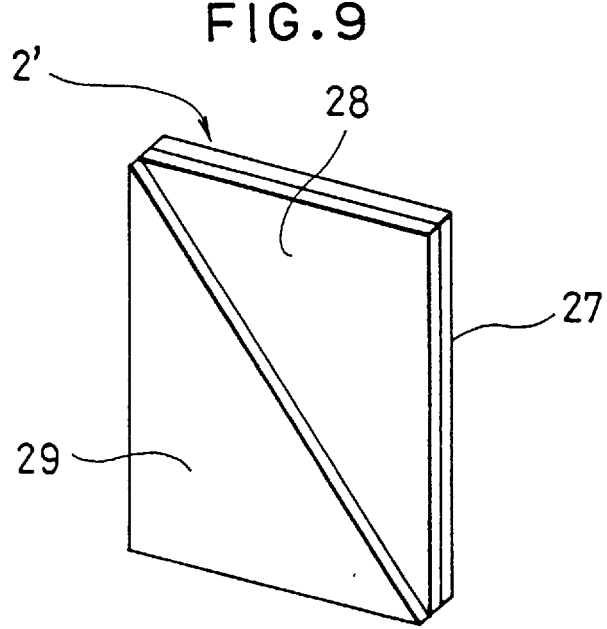
FIG. 9 shows another example of the object reflector.
Figure 10:
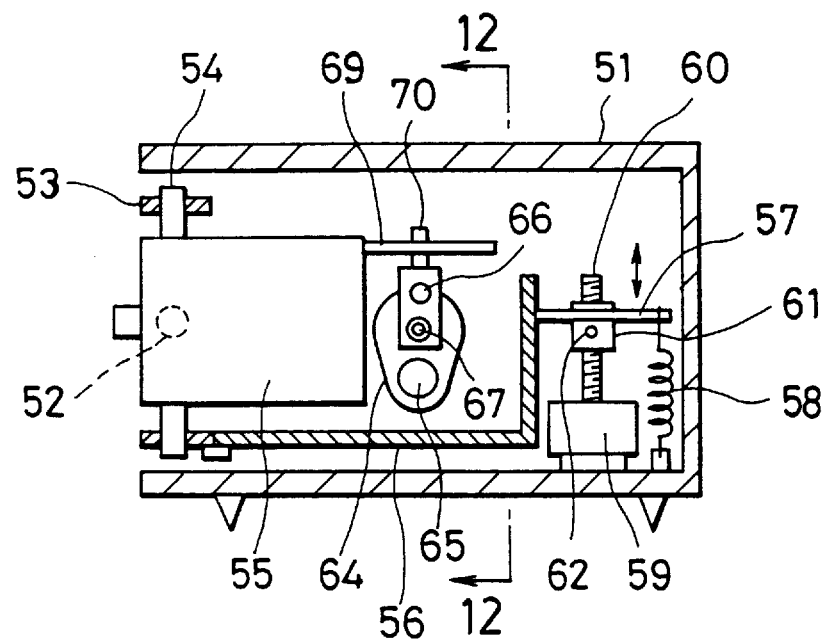
FIG. 10 represents a cross-sectional view of a laser collimator provided with the object reflector detection system of the present invention.
Figure 11:
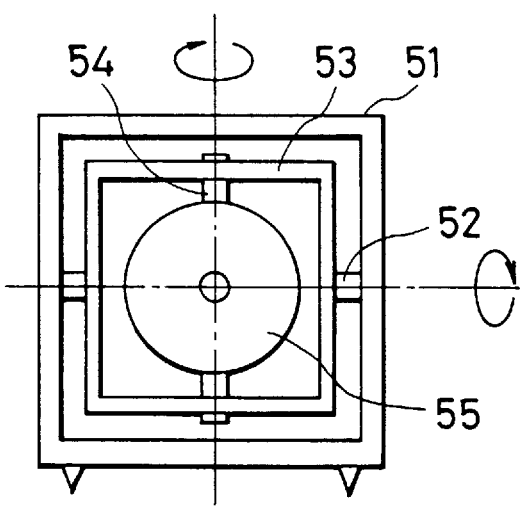
FIG. 11 is a front view of the above laser collimator.
Figure 12:
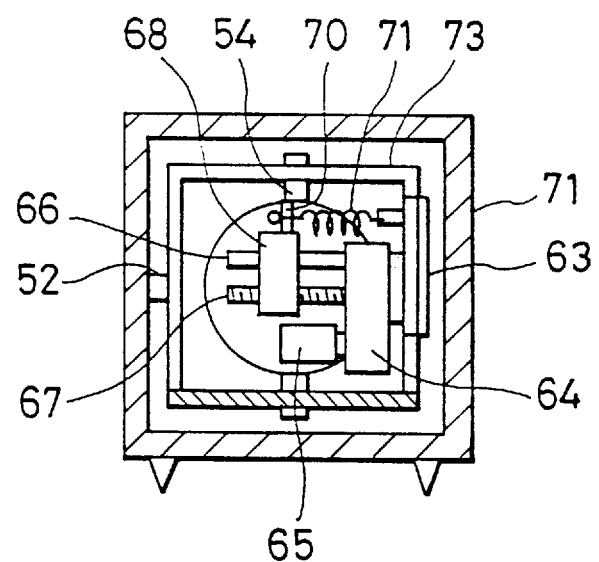
FIG. 12 is an arrow diagram along the line A—A of FIG. 1.

Description is now given on a fourth embodiment, referring to FIG. 8 and FIG. 9.

The fourth embodiment is provided with the function to adjust and control irradiating position of the polarized irradiation light beam with respect to the object reflector.

The rotary irradiation system main unit 1 is arranged at a position tilted by 90° from the position shown in FIG. 1 so that it can be rotated around an axis center perpendicular to the main unit rotating unit 47, and the rotary irradiation system main unit 1 rotates the rotating unit 4 around a horizontal axis. Therefore, the polarized irradiation light beam emitted from the rotating unit 4 is scanned in vertical direction.

Description is now given on the object reflector 2' given in FIG. 9 as used in the present embodiment.

On the object reflector 2', surface of the rectangular reflection layer 28 is divided by a diagonal line (dividing line), and a λ/4 birefringence member 29 is put on one of the divided portions.

The method of dividing is not limited to dividing by a diagonal line. Any dividing method will suffice if line segment ratio of the scanning line on the object reflector 2' divided by a dividing line when the polarized irradiation light beams scans across the object reflector 2' gradually changes at a given relationship when the acrossing position of polarized irradiation light beam moves in a direction perpendicular to the scanning direction.

Next, description will be given on operation, referring to FIG. 2 and FIG. 8.

To detect irradiating position of the polarized irradiaton light beam to the object reflector 2', it is detected from the width of the exposed portion of the reflection layer 28 at scanning position and the portion of the λ/4 birefringence member 29. As described above, there are two methods to detect the width: the method to detect it by light receiving time of reflection light beam on the first photodetector 24 and the second photodetector 25 when polarized irradiation light beam is rotated, and the method to detect from an angle by the encoder 44 mounted coaxially with the rotating unit 4. Here, description is given on the method to use the encoder 44, which causes no error in the rotating speed of the rotating unit 4.

The polarized irradiation light beam is scanned in vertical direction to the object reflector 2'. When the polarized irradiation light beam passes through the object reflector 2', the polarized reflection light beam reflected at the object reflector 2' enters the reflection light detector 5 via the rotating unit 4, and is received by the first photodetector 24 and the second photodetector 25. The light receiving condition of the first photodetector 24 and the second photodetector 25 is detected by the polarized reflection light beam detection circuit 26.

Rotating angle of the rotating unit 4 when output signal of the differential amplifier 34 of the reflection light detection circuit 26 is in positive voltage to bias voltage and rotating angle of the rotating unit 4 when it is in negative voltage to bias voltage are detected by the encoder 44. The ratio of the two rotating angles thus obtained corresponds to the line segment ratio as described above. By obtaining the ratio of the rotating angles, it is possible to identify scanning position of the polarized irradiation light beam of the object reflector 2'. From the ratio of the two rotating angles, it is identified by the position identifier (not shown) at which position of the object reflector 2' the polarized irradiation light beam is irradiated. By the result of this identification, the rotary irradiation main unit 1 is rotated by the main unit rotating unit 47, and the irradiating position of the polarized irradiation light beam is changed to a desired position on the object reflector 2'.

As described above, it is possible according to the present invention to reliably identify the object reflector and to prevent erroneous recognition of the scanning operation.

The present invention is not limited to the laser rotary irradiation system but can also be utilized for the laser reference level setting system to provide fixed reference line.

FIG. 10 to FIG. 13 each represents the case where the present invention is applied on a laser reference level setting system.

As a typical operation to bury concrete pipe into soil, there is working procedure to excavate ground, to place, bury and re-bury concrete pipes into the excavated ditch.

The ground is excavated down to the depth to bury concrete pipes with spacings along a straight line section, and concrete pipes are placed on temporary base arranged at the bottom of the ditch.

The concrete pipes are used as flow passage for city water, sewage, or to pass liquid and are arranged at a certain inclination without bending. If the buried concrete pipes are curved or bent horizontally or vertically, liquid stagnates or clogs or may leak into soil, and the flow passage does not fulfill its originally intended function. Therefore, an adequate reference line must be required when concrete pipes are buried.

The laser reference level setting system is to provide reference line by emitting laser beam. Laser beam is suitable as such reference line because it does not slackens over long distance as thread does or it does not interfere with the working or it is not cut by the working personnel or concrete pipe.

The laser reference level setting system has a laser collimator and a target. The laser collimator is placed at one end of the exacavated ditch, and the target is placed at the other end of the ditch. The position of the target is determined by a surveying instrument such as theodolite.

Next, laser beam is emitted from the laser collimator, which is adjusted in such manner that laser beam is irradiated toward the center of the target. After adjustment of the laser collimator has been completed, laser beam emitted by the laser collimator is made reference line for laying concrete pipes.

Near the front end of a frame 51, a tip frame 53 is rotatably mounted around a horizontal tip shaft 52, and a laser oscillator 55 is movably arranged around a rocking shaft 54, which extends perpendicularly to the tip frame 53.

On lower side of the tip frame 53, a horizontal auxiliary frame 56 extending rearward is disposed, and a horizontal pin 57 is protruded on the horizontal auxiliary frame 56. A spring 58 is arranged between the pin 57 and the frame 51, and this pushes the tip frame 53 in clockwise direction in FIG. 10. On the base of the frame 51, a tip motor 59 is mounted, and a tip screw 60 is connected to output shaft of the tip motor 59. A nut 61 is engaged with the tip screw 60, and a pin 62 protruded on the nut 61 is engaged with the pin 57.

On a lateral side of the tip frame 53, a vertical auxiliary frame 63 is mounted, and a rocking motor 56 is arranged on the vertical auxiliary frame 63 via a gear box 64. From the gear box 64, a guide shaft 66 and a rocking screw 67 are extended in horizontal direction, and the rocking screw 67 is connected to output shaft of the rocking motor 65. A nut block 68 screwed onto the rocking screw 67 is slidably engaged with the guide shaft 66.

A pin 69 protruding horizontally from rear end of the laser oscillator 55 is engaged with an engaging pin 70 protruded on the nut block 68. The laser oscillator 55 is pulled in horizontal direction, i.e. rightward in FIG. 12, by a spring 71, which is provided between the pin 69 and the vertical auxiliary frame 63.

The laser oscillator 55 can be rotated in two directions perpendicular to each other when driven by the tip motor 59 and the rocking motor 65.

Figure 13:
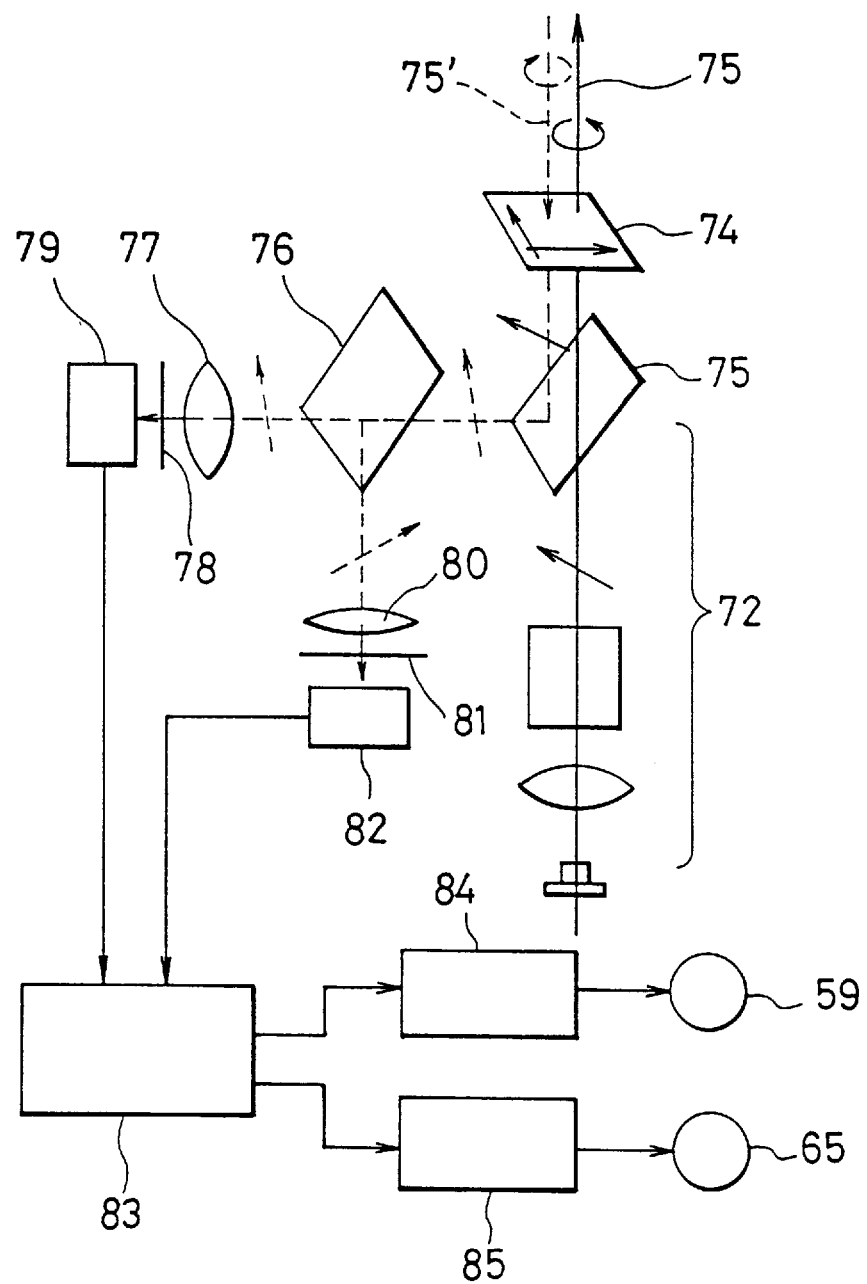
FIG. 13 is a schematical drawing of a laser oscillator of the above laser collimator.

Next, brief description will be given on the laser oscillator 55, referring to FIG. 13.

In this figure, reference numeral 72 represents a laser beam emitter, from which linearly polarized laser beam is emitted. The laser beam from the laser beam emitter 72 passes through a half mirror 73 or a perforated mirror and a λ/4 birefringence member 74. It is turned to circularly polarized laser beam 75 and is irradiated toward the object reflector 2.

The reflection light beam 75' reflected from the object reflector 2 enters the laser oscillator 55 and passes through the λ/4 birefringence member 74. Passing through the λ/4 birefringence member 74, the reflection light beam 75' is turned to linearly polarized light and is reflected at the half mirror 73 toward a half mirror 76. The half mirror 76 splits the reflection light beam 75', and a part of the reflection light beam 75' passing through it is guided through a collimator lens 77 and a polarizing plate 78 toward a first detector 79, and the remaining part of the reflection light beam 75' is guided through the collimator lens 80 and a polarizing plate 81 toward a second detector 82. Planes of polarization of the polarizing plate 78 and the polarizing plate 81 are deviated from each other by 90°.

The first detector 79 and the second detector 82 are designed to issue electric signals corresponding to the received light quantity, and the signals from the first detector 79 and the second detector 82 are inputted to a controller 83. The controller 83 compares the signal from the first detector 79 with the signal from the second detector 82 and calculates deviation. Based on the results of calculation, the controller 83 issues a driving command to a drive unit 84 of the tip motor 59 and to a drive unit 85 of the rocking motor 65.

Upon receipt of the driving command from the controller 83, the drive units 84 and 85 drive the tip motor 59 and the rocking motor 65 respectively to eliminate the deviation.

Next, description will be given on the operation.

The object reflector 2 is set to the position of the target. Circularly polarized laser beam is emitted from the laser oscillator 55, and position of the frame 51 is manually adjusted so that laser beam is irradiated toward the object reflector 2. The rocking motor 65 is driven, and the laser oscillator 55 is reciprocally scanned in horizontal direction at a given angle. When the reflection light beam 75' from the object reflector 2 is received, the controller 83 stops reciprocal scanning of the rocking motor 65, and it is turned to automatic fine adjustment.

The circularly polarized laser beam 75 emitted from the laser oscillator 55 reciprocates between the polarized light reflection unit and the reflection unit of the object reflector 2. As already described, rotating direction in reflecting of circularly polarized light differs between the polarized light reflection unit and the reflection unit. Accordingly, when the reflection light beam 75' entering the laser oscillator 55 passes through the λ/4 birefringence member 74, plane of polarization of linearly polarized laser beam differs between the case where it is reflected at the polarized light reflection unit and the case where it is reflected at the reflection unit.

If the plane of polarization of the polarizing plate 78 is aligned with the plane of polarization of the laser beam reflected at the polarized light reflection unit, the reflection light beam 75' reaching the polarizing plate 81 is shielded by the polarizing plate 81 and is not detected by the second detector 82.

There is difference between the detection signal from the first detector 79 and the detection signal from the second detector 82. The deviation of the two signals is calculated by the controller 83 and driving command is issued to the drive unit 85. The driving command covers rotating direction and amount of rotation of the rocking motor 65, and the rocking motor 65 is driven in such manner that the circularly polarized light beam 75 is moved rightward in FIG. 3.

In case the reflection light beam 75' from the reflection unit enters the laser oscillator 55, laser beam to the first detector 79 is shielded by the polarizing plate 78, and deviation calculated by the controller 83 has reverse sign. Thus, the rocking motor 65 is driven in such manner that the circularly polarized laser beam 75 is moved leftward in FIG. 3.

When the circularly polarized laser beam 75 is aligned with the boundary between the polarized light reflection unit and the reflection unit, deviation between the signals from the first detector 79 and those from the second detector 82 is turned to 0. The tip motor 59 and the rocking motor 65 are not driven, and the position of the laser oscillator 55 is fixed.

By the above operation, position is adjusted in horizontal direction.

To adjust position in vertical direction, the object reflector 2 is rotated by 90° so that the controller 83 controls the tip motor 59. By the procedure similar to the one described above, position can be adjusted in vertical direction.

Further, if the position of the object reflector 2 is deviated due to the reasons such as vibration, deviation occurs again between the signal from the first detector 79 and the signal from the second detector 82. The controller 83 drives the tip motor 59 and the rocking motor 65 to eliminate the deviation, and irradiating position of the laser beam is automatically adjusted to align with the center of the object reflector 2.

In the above embodiment, the laser oscillator 55 is rotated in two directions, i.e. in horizontal and vertical directions, while it may be adjusted in one direction only. Or, the λ/4 birefringence member 74 of the laser oscillator 55 may not be used, and a polarizing plate at 45° to the plane of polarization of the linearly polarized laser beam emitted from the laser oscillator 55 may be put on one half of the reflection layer 28, and the other polarizing plate with the plane of polarization rotated by 90° may be attached on the remaining half of the reflection layer 25. As described above, there are various alternatives in the present embodiments.

The laser oscillator is movably mounted on the frame 51 and the frame 53 in the above, while, ball bearing may be used so far as it is moved in two directions.

We claim:

1. A laser leveling system for setting pipes, comprising a laser emitter rotatably supported for emitting an irradiation light beam to an object reflector, said irradiation light beam being a polarized irradiation light beam, said object reflector having a reflection surface for converting the direction of polarization of said polarized irradiation light beam for reflecting said polarized irradiation light beam; a reflection light beam detector for detecting a reflection light beam reflected from said object reflector; a driving unit having a first driving means for rotating said laser emitter in a vertical direction and a second driving means for rotating said laser emitter in a horizontal direction; and a controller for controlling at least one of said driving means so as to direct the irradiation light beam to the object reflector based on output from said reflection light beam detector.

2. A laser leveling system for setting pipes according to claim 1, wherein the reflection surface of the object reflector is divided into a plurality of surface parts, wherein at least one of said surface parts comprises a reflection layer which is a reflecting portion for reflecting the light beam as a polarized reflection light beam which preserves the direction of polarization of the polarized irradiation light beam, and wherein at least one other of said surface parts comprises a birefringence layer and a reflecting layer and is a polarized light converting and reflecting portion for reflecting the light beam as a polarized reflection light beam with the direction of polarization converted from that of the polarized irradiation light beam.

3. A laser leveling system for setting pipes according to claim 2, wherein the controller controls the driving unit in such manner that the irradiation light beam is aligned with the boundary between said surface parts of the object reflector through comparison of output of the first detecting means with output of the second detecting means.

4. A laser leveling system for setting pipes according to claim 5, wherein there is provided an identifying unit for identifying the position where the polarized irradiation light beam strikes the object reflector from the ratio of width of the polarized light converting and reflecting portion to width of the reflecting portion based on the output of the first detecting means and the output of the second detecting means and for outputting an irradiation position signal, and the emitting direction of the irradiation light beam is controlled according to the irradiation position signal from said identifying unit.

5. A laser leveling system for setting pipes, comprising a laser emitter rotatably supported for emitting an irradiation light beam to an object reflector; a reflection light beam detector for detecting a reflection light beam reflected from said object reflector, said reflection light beam detector comprising a first detecting means for detecting a polarized reflection light beam, said first detecting means having a first output, and a second detecting means for detecting a polarized light beam, said second detecting means having a second output; a driving unit having a first driving means for rotating said laser emitter in a vertical direction and a second driving means for rotating said laser emitter in a horizontal direction; and a controller for controlling said driving unit through comparison of said first output of said first detecting means with said second output of said second detecting means so as to direct the irradiation light beam to the object reflector based on output from said reflection light beam detector.

6. A laser reference line setting system for laying a pipe, comprising a laser projector and a target having a center, wherein said laser projector has a laser emitter rotatably supported for projecting an irradiation light beam toward said target; a reflection light beam detector for detecting a reflection light beam reflected from said target; a first driving unit for rotating said laser emitter in the vertical direction; a second driving unit for rotating said laser emitter in the horizontal direction; and a controller for controlling the rotation of either said first driving unit or said second driving unit so as to scan reciprocally within a predetermined angle and to direct the irradiation light beam toward said center of said target based on an output of said reflection light beam detector; and wherein said target has a first reflection surface and a second reflection parallel with said first reflection surface, said first and second reflection surfaces being arranged in the rotation direction of said laser projector.

7. A laser reference line setting system for laying a pipe according to claim 6, wherein said irradiation light beam is a polarized irradiation light beam, and wherein said first reflection surface converts the direction of polarization of said polarized irradiation light beam and reflects said polarized irradiation light beam.

8. A laser reference line setting system for laying a pipe according to claim 6, wherein: said irradiation light beam is a polarized irradiation light beam; said reflection light beam detector comprises a first detecting means for detecting a polarized reflection light beam reflected from said target, said first detecting means having a first output, and a second detecting means for detecting a polarized reflection light beam with the direction of polarization converted from that of said polarized irradiation light beam, said second detecting means having a second output; and said controller controls said driving unit through comparison of said first output of said first detecting means with said second output of said second detecting means.

9. A laser reference line setting system for laying a pipe according to claim 7, wherein said second reflection surface of said target comprises a reflection layer which is a reflection surface for reflecting the light beam as a polarized reflection light beam which preserves the direction of the polarization of the polarized irradiation light beam, and wherein said first reflection surface comprises a birefringence layer and a reflecting layer.

10. A laser reference line setting system for laying a pipe according to claim 7, wherein two reflection surfaces of said target are arranged close to each other forming a boundary in between, and wherein one of said reflection surfaces is a reflection surface for converting the direction of polarization of said polarized irradiation light beam and for reflecting said polarized irradiation light beam, and wherein said irradiation light beam is directed toward said boundary of said reflection surfaces through the comparison of said first output of said first detecting means with said second output of said second detecting means.

11. A laser reference line setting system for laying a pipe, comprising a laser projector and a target having a center, wherein said laser projector has a laser emitter rotatably supported for projecting an irradiation light beam toward said target; a reflection light beam detector for detecting a reflection light beam reflected from said target; a first driving unit for rotating said laser emitter in the vertical direction; a second driving unit for rotating said laser emitter in the horizontal direction; and a controller for controlling the rotation of either said first driving unit or said second driving unit so as to scan reciprocally within a predetermined angle and for controlling the rotation of said first driving unit and said second driving unit so as to direct the irradiation light beam toward said center of said target based on an output of said reflection light beam detector for detecting a reflection light beam reflected from said target; and wherein said target has a first and a second reflection surface, said first reflection surface having a greater width than the width of said second reflection surface, said first and second reflection surfaces being arranged in the rotation direction of said laser projector.

12. A laser reference line setting system for laying a pipe according to claim 11, wherein said irradiation light beam is a polarized irradiation light beam, and wherein said first reflection surface is for converting the direction of polarization of said polarized irradiation light beam and for reflecting said polarized light beam.

13. A laser reference line setting system for laying a pipe according to claim 11, wherein at least one of said reflection surfaces of said target comprises a reflection layer which is a reflection surface for reflecting the light beam as a polarized reflection light beam which preserves the direction of the polarization of the polarized irradiation light beam, and wherein at least one other of said reflection surfaces of said target comprises a birefringence layer and a reflecting layer and is a polarized light converting and reflecting surface for reflecting the light beam as a polarized reflection light beam with the direction of polarization converted from that of said polarized irradiation light beam.

14. A laser reference line setting system for laying a pipe according to claim 11, wherein: said irradiation light beam is a polarized irradiation light beam; said reflection light beam detector comprises a first detecting means for detecting a polarized reflection light beam reflected from said target, said first detecting means having a first output, and a second detecting means for detecting a polarized reflection light beam with the direction of polarization converted from that of said polarized irradiation light beam, said second detecting means having a second output; and said controller controls said driving unit through the comparison of said first output of said first detecting means with said second output of said second detecting means.

15. A laser reference line setting system for laying a pipe according to claim 14, wherein two reflection surfaces of said target are arranged close to each other forming a boundary in between, and wherein one of said reflection surfaces is a reflection surface for converting the direction of polarization of said polarized irradiation light beam and for reflecting said polarized irradiation light beam, and wherein said irradiation light beam is directed toward said boundary of said reflection surfaces through the comparison of said first output of said first detecting means with said second output of said second detecting means.

16. A laser reference line setting system for laying a pipe according to claim 14, wherein said irradiation light beam is directed toward a predetermined position of said target based on the comparison of said first output of said first detecting means with said second output of said second detecting means.

17. A laser reference line setting system for laying a pipe according to claim 6, wherein said first reflection surface converts the direction of polarization of said polarized irradiation light beam, and wherein said system further comprises a detector for detecting the widths of the light reflected from said first reflection surface and of the light reflected from said second reflection surface, and further comprising an identifier for identifying a position where the polarized irradiation light beam hits said target from the width of said light reflected from said first reflection surface and of said light reflected from said second reflected surface, whereby the direction of the emission of said polarized irradiation light beam is controlled according to the irradiation position signal from said identifier.

18. A laser reference line setting system for laying a pipe according to claim 17, further comprising a focus controller for obtaining a distance signal by calculating the distance of said target based on the output of said detector and for operating a focusing mechanism based on said distance signal.

19. A laser reference line setting system for laying a pipe according to claim 11, wherein said first reflection surface converts the direction of polarization of said polarized irradiation light beam, and wherein said system further comprises a detector for detecting the widths of the light reflected from said first reflection surface and of the light reflected from said second reflection surface, and further comprising an identifier for identifying a position where the polarized irradiation light beam hits said target from the width of said light reflected from said first reflection surface and of said light reflected from said second reflected surface, whereby the direction of the emission of said polarized irradiation light beam is controlled according to the irradiation position signal from said identifier.

20. A laser reference line setting system for laying a pipe according to claim 19, further comprising a focus controller for obtaining a distance signal by calculating the distance of said target based on the output of said detector and for operating a focusing mechanism based on said distance signal.

* * * * *